United States Patent Office 2,890,029
Patented June 9, 1959

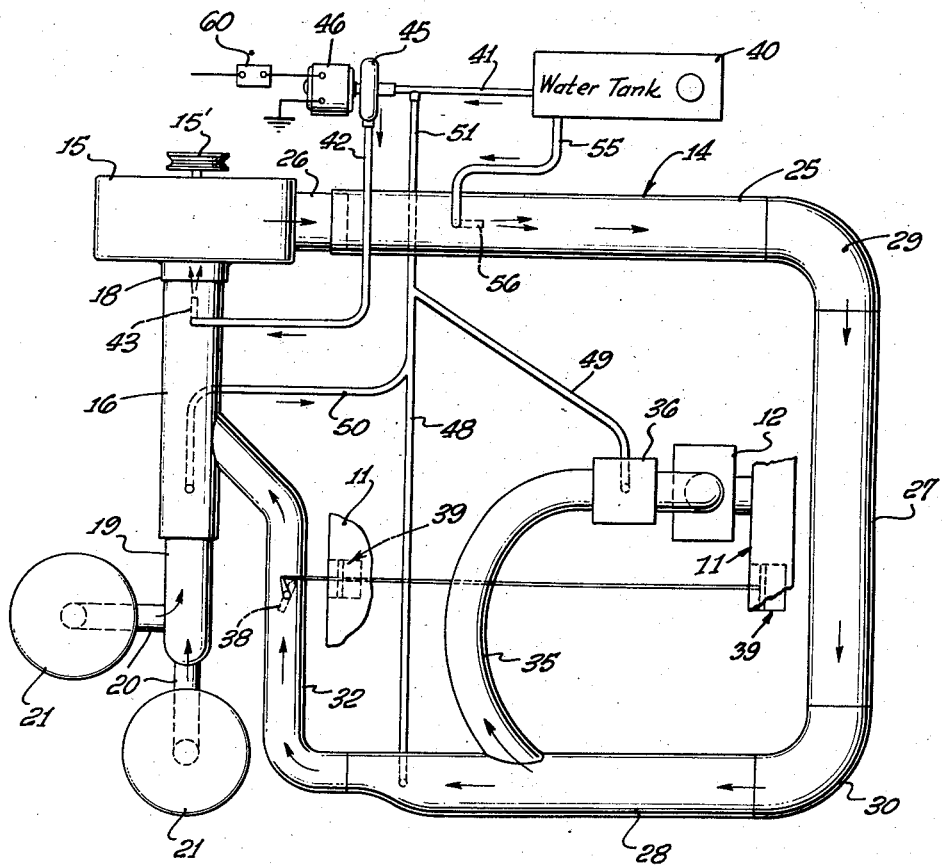

2,890,029
MEANS FOR CONDITIONING AND SUPPLYING AIR TO AN INTERNAL COMBUSTION ENGINE

Melvin E. Hicks, Oxnard, Calif.

Application October 22, 1957, Serial No. 691,699

8 Claims. (Cl. 261—18)

This invention has to do with means for constantly supplying an internal combustion engine with a supply of anti-detonant-containing air, particularly moist or humid air.

I am aware that many different arrangements have been devised for supplying anti-detonants to internal combustion engines including those for injecting water into the intake air stream to the engine either continuously or during periods when high power is required of the engine. Where water or other anti-detonant has been sprayed into the air stream, this has not been entirely successful, especially at low engine speeds when only a limited quantity of air is being used by the engine.

Therefore, it is an object of my invention to provide novel means for continually supplying moist air or air heavily saturated with water, or other anti-detonant fluid, to an internal combustion engine. In this connection it is an object to provide a novel arrangement and means whereby the air supply is substantially saturated with the anti-detonant.

A further object of the invention is to provide novel means of the type indicated in which a supply of moist or saturated air in excess of that required by the engine is kept circulating at relatively high velocity in an endless path together with means for conducting air from this supply to the engine as needed.

A still further object is to provide a novel air saturation or conditioning means for use in supplying moist air to an internal combustion engine.

Another object is to provide an air-conditioning or saturation means wherein the conditioned air is supplied to the engine at a moderate pressure.

Another object is to provide means of the type indicated which is relatively inexpensive and can be readily applied to internal combustion engines in motor vehicles or in other installations.

These and other objects will be apparent from the drawing and the following description. The figure in the drawing is a diagrammatic representation of apparatus embodying the invention.

Referring to the drawing, it may be assumed that the apparatus is to be operably associated with an internal combustion engine of which only the intake manifold 11 and carburetor 12 are shown fragmentarily indicated at 11. By way of illustration I show the carburetor 12 which may be assumed to be a part of the engine, however, it is to be understood that the apparatus to be described may be used with internal combustion engines not having a carburetor as where fuel injection is used. The device includes a main conduit means, designated 14, which provides an endless path or passage for the circulation of air. A centrifugal blower of conventional construction, designated 15, is connected in the conduit means 14 for the circulation of air in the direction of the arrows appearing on the drawing. The blower has a sheave 15' so that it may be driven by the engine as by means of the conventional fan belt (not shown). The speed of the blower thus will be proportional to that of the engine. The capacity of the blower should be such as to circulate an excess of air over that required by the engine.

The conduit means includes an intake section 16 which leads to the inlet 18 of the blower. Section 16 is provided with an extension 19 and a pair of inlet pipes 20, the open ends of which are fitted with air filters 21 which may be of conventional construction. Thus air is admitted to the section 16 and blower 15 as required to replace that used by the engine as will later appear.

Conduit means 14 includes a section 25 connected to the outlet 26 of the blower, and beyond this, sections 27 and 28 connected by the bends 29 and 30, respectively. Section 28 is connected to the inlet section 16 by a tube 32 which is preferably of reduced cross-sectional area as compared to the other sections of the main conduit means 14 thereby providing more resistance to the flow of air therethrough than provided by the three other sections.

Between the conduit section 28 and carburetor 12 I provide an open branch conduit 35 for flow of air to the carburetor. In engines where a carburetor is not employed the conduit would be connected to the intake manifold of the engine. Conduit 35 may include a suitable trap 36 for removing excess water or other anti-detonant liquid which may be used from the air.

It is a particular feature of the invention that I provide means for further restricting flow of air through the conduit section 32 when the engine requires a large volume of air. This may comprise a valve 38 of any conventional construction and means operable in response to the intake manifold pressure of the engine for controlling the valve. Such means has been shown diagrammatically and indicated by numeral 39, shown positioned in the intake manifold 11. Thus the valve 38 is normally open when only a limited quantity of air is required by the engine. However, under conditions where additional air is required, as at high engine speeds or during periods of acceleration, the raising of the intake manifold pressure, or the lessening of the suction of the manifold serves to partially or substantially close valve 38, with the result that the pressure of the air in the conduit means 14 builds up and the engine is supplied with additional air at an increase in pressure.

In order to provide an anti-detonant, such as water, in the air supplied the engine, the system being particularly designed for providing substantially water-saturated air, I provide a supply of water and introduce this into the conduit means 14 at one or more appropriate points. Hereinafter I will merely refer to the use of water as the anti-detonant, however it is to be understood that other anti-detonants can be used in the apparatus. Accordingly, I provide a container 40 to hold a supply of water. This is connected by conduits 41 and 42 to an outlet orifice or spray nozzle 43 located in conduit section 16 adjacent the inlet of blower 15. A pump 45 is provided for circulating liquid through the conduits 41 and 42 and this may be driven by an electric motor 45 or it may be directly driven by the internal combustion engine 11 itself. Since water may accumulate in the system due to condensation or because of the introduction of an excess, I provide drain pipes 48, 49, 50 and 51 to return the water to the intake side of pump 45.

With the construction described, water supplied on the intake side of the blower is thoroughly dispersed in the turbulent, high velocity air stream produced by the blower in the conduit means 14. Since the blower circulates an excess of air over that required by the engine and this excess air continues to travel in the closed circuit path by the conduit means 14, the air becomes thoroughly saturated with water before reaching the engine. Also, it should be noted that the blower serves as a high-speed churn to break up the droplets of water as they are initially introduced into the system.

Another feature of the invention is the provision of auxiliary means for supplying additional water to the air stream when the velocity of the air in the conduit section 25 is exceptionally high, as, for example, when the engine is operating at high speed and requires additional air. This means comprises a conduit 55 leading from container 40 to the interior of conduit section 25. Conduit 55 terminates in a nozzle or port 56 which is preferably of a type which operates by aspiration to withdraw water from the tank only when the air is flowing at high velocity past the nozzle. Thus, when the engine requires a large volume of air, additional water can be supplied to insure adequate saturation of the air.

In order to increase the efficiency of the system I prefer to encase the conduit means 14 and branch conduit 35 with heat insulation means of a conventional type to insure the air supply therein being kept at a relatively low temperature.

It may be desirable when the engine is cold to prevent the addition of water to the system, and, in view of this I show a termostat-type switch 60 in the circuit to the motor which may be so located and adjusted as to close the motor circuit only after the engine is warm. If the water pump is operated by the motor, a thermostat valve may be employed in line 42 in conjunction with a pressure relief-type bypass.

Although I have illustrated and described a preferred form of my invention, I contemplate that various changes and modifications can be made therein without departing from the invention, the scope of which is indicated by the following claims.

I claim:

1. In combination with an internal combustion engine having a carburetor, means for conditioning and supplying air to the carburetor of the engine, comprising a main conduit means forming an endless passage for circulation of air, a blower for moving air in a given direction around said passage, said conduit means having an opening for inlet of air, means for injecting an anti-detonant fluid into the air stream in said passage, and a branch conduit leading from said passage to the carburetor of the engine.

2. Means as set forth in claim 1 in which a normally open valve is included in said passage downstream of said branch conduit and in which means is provided for operating said valve toward closed position in response to an increase in the air requirements of the engine.

3. Means as set forth in claim 1 in which said main conduit means is formed to provide a region of restricted cross-sectional area between said branch conduit and the intake side of said blower.

4. Means as set forth in claim 1 in which said main conduit means is formed to provide a region of restricted cross-sectional area between said branch conduit and the intake side of said blower, in which a normally open valve is provided between said branch conduit and the intake side of said blower, and in which means is provided for operating said valve toward closed position in response to an increase in the air requirements of the engine.

5. In combination with an internal combustion engine, means for conditioning and supplying air to the engine, comprising main conduit means forming an endless passage for circulation of air, a blower for moving air in a given direction around said passage, said conduit means having an opening for inlet of air, means for injecting an anti-detonant fluid into the air stream in said passage, a branch conduit leading from said passage to the engine, a normally open valve in said endless passage downstream of said branch conduit, and means operable in response to an increase in the intake manifold pressure of the engine for moving said valve toward closed position.

6. In combination with an internal combustion engine having a carburetor, means for conditioning and supplying air to the engine, comprising main conduit means forming an endless passage for circulation of air, a blower for moving air in a given direction around said passage, said conduit means having an opening for inlet of air, a container for holding a supply of anti-detonant fluid, anti-detonant conduit means between said container and said main conduit means, means for circulating anti-detonant fluid from said tank through said anti-detonant conduit means to said main conduit means, and a branch conduit leading from said endless passage to the carburetor of the engine.

7. In combination with an internal combustion engine having a carburetor, means for conditioning and supplying anti-detonant-containing air to the engine, comprising main conduit means forming an endless passage for circulation of air, a blower for moving air in a given direction around said passage, said conduit means having an opening for inlet of air, means for injecting an anti-detonant fluid into the air stream in said passage substantially at the region of the intake of said blower, and a branch conduit leading from said passage to the carburetor of the engine.

8. In combination with an internal combustion engine, means for supplying anti-detonant-containing air to the engine, comprising main conduit means forming an endless passage for circulation of air, a blower for moving air in a given direction around said passage, said conduit means having an opening for inlet of air, means for injecting an anti-detonant fluid into the air stream in said passage substantially at the region of the intake of said blower, means for conveying anti-detonant fluid to said passage in the region of the outlet of said blower and operable in response to relatively high velocity of air in said passage, and a branch conduit leading from said passage to the engine.

References Cited in the file of this patent

UNITED STATES PATENTS

| | | |
|---|---|---|
| 1,574,130 | Smith | Feb. 23, 1926 |
| 2,576,196 | Stanalis | Nov. 27, 1951 |
| 2,769,624 | Burnside | Nov. 6, 1956 |